Figure 1:
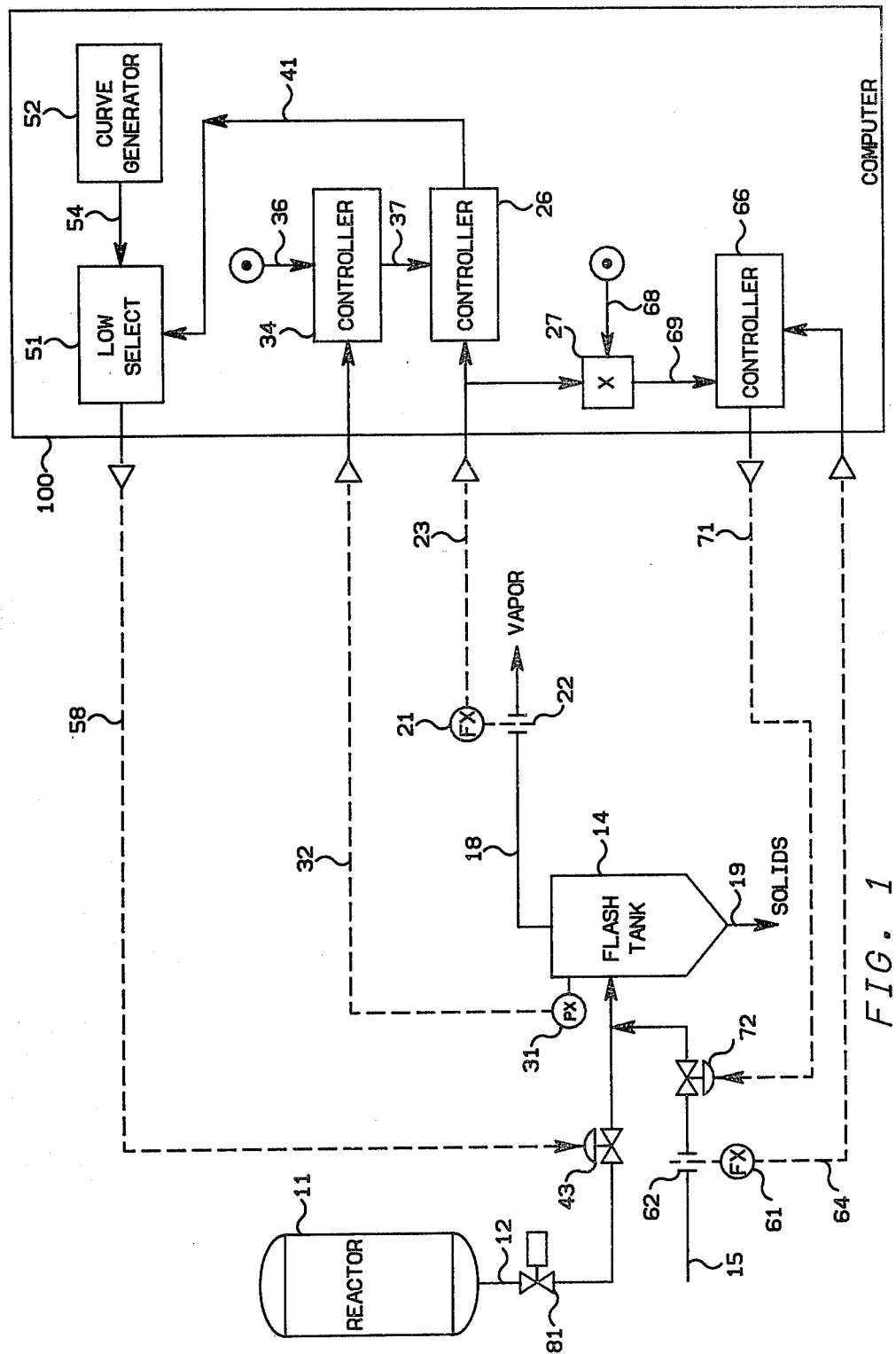

United States Patent [19]

Morgan

[11] Patent Number: 4,469,560
[45] Date of Patent: Sep. 4, 1984

[54] CONTROL OF DUMPING OF A REACTOR

[75] Inventor: John A. Morgan, Bartlesville, Okla.

[73] Assignee: Phillips Petroleum Company, Bartlesville, Okla.

[21] Appl. No.: 400,187

[22] Filed: Jul. 20, 1982

[51] Int. Cl.³ ............................................. B01D 3/42
[52] U.S. Cl. ...................................... 203/2; 202/206; 203/88; 203/DIG. 18; 422/112; 422/131
[58] Field of Search ......................................... 203/1–3, 203/DIG. 18, 88; 202/206, 205; 422/110, 112, 115, 131

[56] References Cited

U.S. PATENT DOCUMENTS 3,676,653   7/1972   Arens ........................................ 203/1
3,941,664   3/1976   Scoggin .................................... 203/1

Primary Examiner—Frank Sever
Attorney, Agent, or Firm—French, Hughes and Doescher

[57] ABSTRACT

In a batch process in which reaction effluent is dumped from the reactor to a flash tank through a dump line which contains both a dump valve and a control valve, the control valve is manipulated in response to a signal which opens the control valve at a desired rate as a function of time or in response to a signal which is representative of the maximum opening of the control valve which can be maintained without exceeding a pressure limit in the flash tank whichever signal is representative of the lower opening of the control valve. In this manner, reaction effluent is withdrawn from the reactor at a substantially maximum rate without causing flashing across the dump valve and without exceeding a pressure limitation for the flash tank.

8 Claims, 2 Drawing Figures

CONTROL OF DUMPING OF A REACTOR

This invention relates to control of a batch process. In one aspect this invention relates to method and apparatus for manipulating the rate at which the reaction mixture in a reactor used in a batch process is removed from the reactor and provided to a flash tank.

A diluent fluid is utilized in many batch processes such as batch polymerization processes. The diluent fluid typically does not react and thus is present in the reaction effluent withdrawn from the batch reactor. In some processes, the diluent fluid present in the reaction effluent is removed by providing the reaction effluent to a flash tank wherein the diluent fluid is flashed and removed as a vapor.

Some batch processes employ two valves in the dump line between the batch reactor and a flash tank. The first valve (referred to hereinafter as the "dump valve") is typically opened at a predetermined time to dump the batch reactor at the end of a reaction period. The second valve (referred to hereinafter as the "control valve") is typically utilized to control the rate at which the reaction effluent is removed from the batch reactor and provided to the flash tank.

Two considerations must be taken into account when dumping a batch reactor to a flash tank. The first consideration is that a pressure limit for the flash tank must not be exceeded. A second consideration is that if the reactor is dumped too fast flashing will occur across the dump valve causing the dump line to become plugged. To prevent a pressure limit from being exceeded, it has been typical in the past to simply close both the dump valve and the control valve if the pressure limit is approached. To avoid the problem of flashing across the dump valve, the control valve has been opened more slowly than might be allowable and/or not as much as might be allowable. All of these control techniques are undesirable since they adversely affect the time required to dump a batch reactor to a flash tank.

It is thus an object of this invention to provide method and apparatus for manipulating the rate at which the reaction mixture in a batch reactor is removed from the batch reactor and provided to a flash tank in such a manner that a maximum rate of withdrawal is achieved without exceeding a pressure limitation for the flash tank or causing flashing to occur across the dump valve.

In accordance with the present invention, method and apparatus is provided whereby the control valve is manipulated in response to a signal which opens the control valve at a desired rate as a function of time or in response to a signal which is representative of the maximum opening of the control valve which can be maintained without exceeding a pressure limit in the flash tank whichever signal is representative of the lower opening of the control valve. In this manner, if the pressure in the flash tank is lower than the maximum allowed pressure, the control valve will be opened at the desired rate as a function of time. However, if the pressure in the flash tank reaches or tries to exceed the maximum allowed pressure, the control valve will be throttled towards a more closed position regardless of the position which would be allowed by the desired rate signal.

Figure 2:
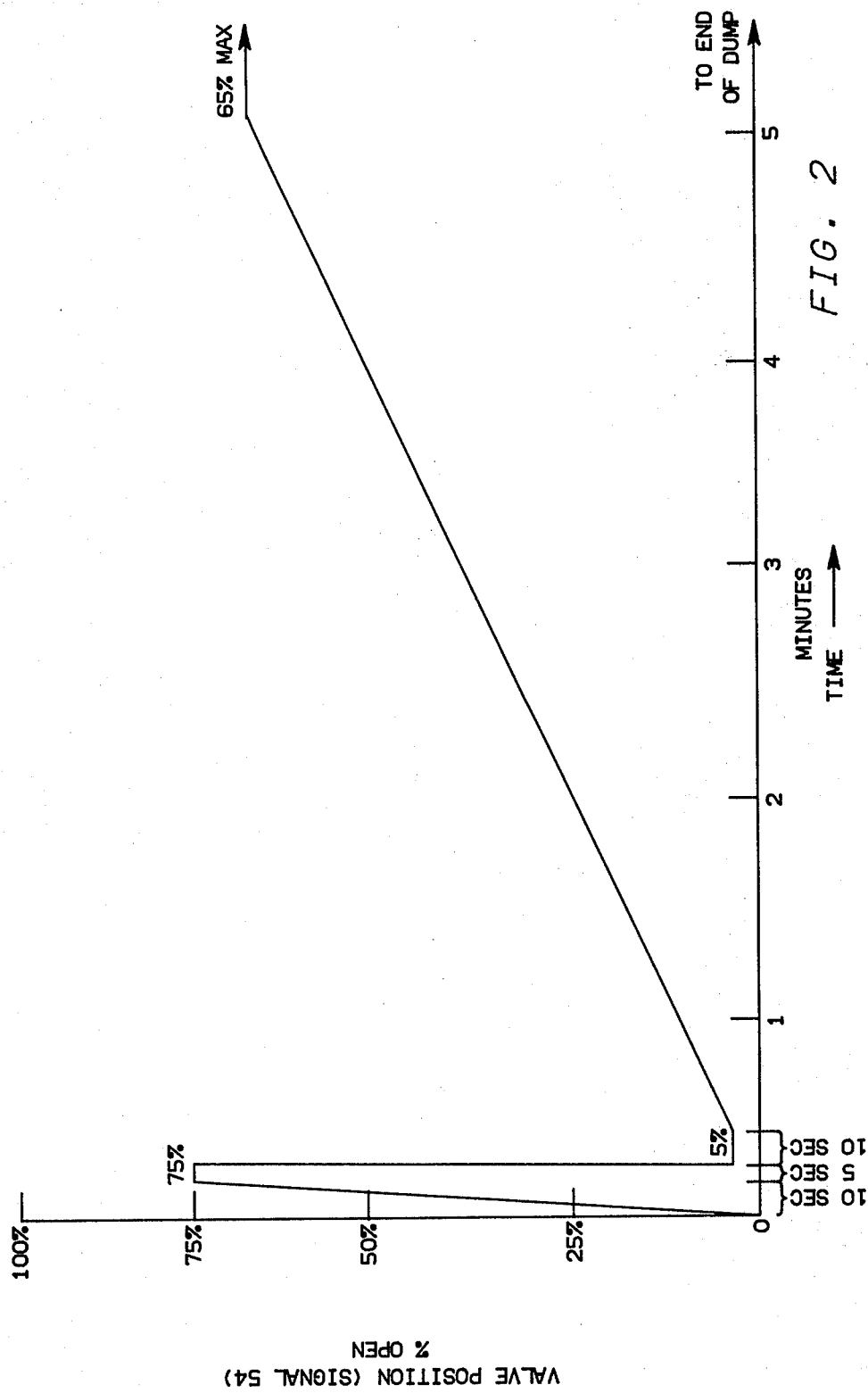

Other objects and advantages of the invention will be apparent from the foregoing brief description of the invention and the claims as well as the detailed description of the drawings in which:

FIG. 1 is a diagramatic illustration of a specific batch reaction process and the associated control system of the present invention; and FIG. 2 is a graphical illustration of a preferred valve control signal generated by the curve generator illustrated in FIG. 1.

The invention is described in terms of a process for preparing a poly (arylene sulfide) polymer by reacting at least one polyhalo-substituted cyclic compound containing unsaturation between adjacent ring atoms (the halogen atoms are attached to ring carbon atoms) with an alkali metal sulfide in a polar organic diluent at an elevated temperature as is described in U.S. Pat. No. 3,354,129. However, the invention is applicable to the control of any batch process in which it is desired to remove a diluent from the reaction effluent in a flash tank and where the rate at which the reaction effluents are removed from the batch reactor and provided to the flash tank is critical.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Other types of computing devices could also be used in the invention. The digital computer is preferably a DCI-4000 Distributed Control Unit from Fischer Porter.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurment signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, there is illustrated a batch reactor 11. As has been previously stated, at least one polyhalo-substituted cyclic compound is reacted with an alkali metal sulfide in a polar organic diluent at an elevated temperature in the reactor 11 to produce poly (arylene sulfide) as described in U.S. Pat. No. 3,354,129.

Reaction effluent is withdrawn from the reactor 11 through conduit means 12 and is provided to the flash tank 14. The reaction effluent will generally comprise poly (arylene sulfide), the polar organic diluent, by-product alkali metal halide and reaction impurities.

Steam flowing through conduit means 15 is mixed with the reaction effluent flowing through conduit means 12. The steam is added to reduce the dew point of the polar organic diluent as an aid to flashing of the diluent.

The flashed polar diluent is removed as a vapor from the flash tank through conduit means 18. Solids are removed from the flash tank 14 through conduit means 19.

The process described to this point for the production of poly (arylene sulfide) is conventional. It is the manner in which the process is controlled so as to substantially maximize the rate at which the reaction effluent can be dumped from the reactor 11 to the flash tank 14 without exceeding process constraints which provides the novel features of the present invention.

Flow transducer 21 in combination with the flow sensor 22, which is operably located in conduit means 18, provides an output signal 23 which is representative of the flow rate of vapor through conduit means 18. Since the flow rate of the vapor through conduit means 18 is directly proportional to the reaction effluent flow rate through conduit means 12, the magnitude of signal 23 will be directly proportional to the magnitude of the flow rate of the reaction effluent through conduit means 12. Signal 23 is provided from the flow transducer 21 as an input to computer means 100 and is specifically provided to the controller block 26 and the multiplying block 27.

Pressure transducer 31 in combination with a pressure sensing device which is operably located in the flash tank 14 provides an output signal 32 which is representative of the actual pressure in the flash tank 14. Signal 32 is provided from the pressure transducer 31 as an input to computer means 100 and is specifically provided to the controller block 34.

The controller block 34 is also provided with signal 36 which is representative of the maximum allowable pressure in the flash tank 14. In response to signals 32 and 36, the controller block 34 provides an output signal 37 which is responsive to the difference between signals 32 and 36. Signal 37 is scaled so as to be representative of the flow rate of vapor through conduit means 18 required to maintain the actual pressure in the flash tank 14 substantially equal to the maximum pressure represented by signal 36. Again, since the flow rate of vapor through conduit means 18 is directly proportional to the flow rate of the reaction effluent through conduit means 12, signal 37 will be directly proportional to the flow rate of the reaction effluent through conduit means 12 required to maintain the actual pressure in the flash tank 14 substantially equal to the maximum allowable pressure represented by signal 36. Signal 37 is provided from the controller block 34 as the set point input to the controller block 26.

In response to signals 23 and 37, the controller block 26 provides an output signal 41 which is responsive to the difference between signals 23 and 37. Signal 41 is scaled so as to be representative of the position of the control valve 43, which is operably located in conduit means 12, required to maintain the actual pressure in the flash tank 14 substantially equal to the maximum allowable pressure represented by signal 36. Signal 41 is provided from the controller block 26 as an input to the low select block 51.

The curve generator 52 provides an output signal 54, which is representative of a desired position for the control valve 43, to the low select 51. The curve generator 52 is preferably a calculation module which is described beginning at page 87 of the DCU Configuration Guide published by Fischer Porter in June 1980.

A plot of signal 54 as a function of time is illustrated in FIG. 2. The output from the curve generator 52 illustrated in FIG. 2 was actually used in a particular process but is should be noted that the output from the curve generator 52 will generally vary between processes and the particular output will be based on operating experience.

Referring now to FIG. 2, during the first few seconds of the dump, the control valve 43 is opened and then closed quickly to blow out the dump line 12. The valve position is then allowed to open at a constant rate for five minutes until the control valve 43 is 65 percent open and then this opening is maintained until the end of the dump.

The low select 51 selects the one of signals 41 and 54 which is representative of the lower percentage opening of the control valve 43 to be supplied as signal 58 which is provided as an output from computer 100. Signal 58 is provided as the control signal to the control valve 43 and the control valve 43 is manipulated in response thereto.

Flow transducer 61 in combination with the flow sensor 62, which is operably located in conduit means 15, provides an output signal 64 which is representative of the actual flow rate of steam through conduit means 15. Signal 64 is provided from the flow transducer 61 as an input to computer 100 and is specifically provided to the controller block 66.

Signal 68, which is representative of the desired ratio between the flow rate of the vapor flowing through conduit means 18 and the flow rate of the steam flowing through conduit means 15, is provided as an input to the multiplying block 27. It is again noted that signal 68 is proportional to the desired ratio between the flow rate of the reaction effluent through conduit means 12 and the flow rate of steam through conduit means 15.

Signal 23 is multiplied by signal 68 to establish signal 69 which is representative of the desired flow rate of steam through conduit means 15. Signal 69 is provided as the set point input to the controller block 66.

In response to signal 64 and 69, the controller block 66 provides an output signal 71 which is responsive to the difference between signals 64 and 69. Signal 71 is scaled so as to be representative of the position of the control valve 72, which is operably located in conduit means 15, required to maintain the actual flow rate of steam substantially equal to the desired flow rate represented by signal 69. Signal 71 is provided as a control output from computer 100 to the control valve 72 and the control valve 72 is manipulated in response thereto.

In operation, the dump control valve 81, which is operably located in conduit means 12, is opened either manually or automatically at the end of the reaction period. Control valve 43 will then be opened in response to signal 54 which will always be selected by the low select at the beginning of the dump since signal 41 will generally have a valve which would allow the control valve 43 to be fully opened at the beginning of a dump. Essentially, signal 54 allows the control valve 43 to be opened as quickly as possible without causing flashing across the dump valve 81 and thus plugging of the dump line 12. However, if the pressure in the flash tank 14 reaches or tries to exceed the pressure limit represented by signal 36, signal 41 will assume a value which will force its selection by the low select 51 in such a manner that a control in response to the curve generator 52 is overriden so as to insure that a pressure limit for the flash tank is not exceeded. Thus, the primary control of the control valve 43 is based on the output from the curve generator which allows the control valve 43 to be opened as quickly as possible without producing flashing across the dump valve 81. Control based on the pressure in the flash tank 14 will override the control based on the output from the curve generator 52 only when the pressure in the flash tank 14 reaches or tries to exceed the maximum allowable pressure represented by signal 36.

The flow rate of steam will be controlled to maintain a desired steam to reaction effluent ratio in the flash tank 14. Thus, the flow rate of steam will also increase as a function of time since the flow rate of the reaction effluent will, in general, be increasing as a function of time.

In summary, the control system of the present invention acts to dump the reactor 11 to the flash tank 14 as quickly as possible without causing flashing across the dump valve 81 and without exceeding a pressure limit for the flash tank 14. Also, the control system will maintain a desired steam to reaction effluent ratio in the flash tank 14.

The invention has been described in terms of a preferred embodiment as illustrated in FIGS. 1 and 2. Specific components used in the practice of the invention as illustrated in FIG. 1 such as control valves 43, 72 and 81; pressure transducer 31; flow transducers 21 and 61 and flow sensors 22 and 62 are each well known, commercially available control components such as are described at length in Perry's Chemical Engineers Handbook, 4th. edition, chapter 22, McGraw-Hill.

For reasons of brevity, conventional auxilliary equipment such as pumps, heat exchangers, additional measurement-control devices, additional process equipment, etc., have not been included in the above description as they play no part in the explanation of the invention.

While the invention has been described in the terms of the presently preferred embodiment, reasonable variations and modifications are possible by those skilled in the art and such variations and modifications are within the scope of the described invention and the appended claims.

That which is claimed is:

1. Apparatus comprising:
    a reactor;
    a flash tank;
    a dump line for withdrawing the reaction effluent from said reactor and for providing the thus withdrawn reaction effluent to said flash tank;
    a dump valve operably located in said dump line;
    a control valve operably located in said dump line, wherein said reaction effluent flows through said dump valve prior to flowing through said control valve;
    means for establishing a first signal representative of the desired opening of said control valve at any time during which said reaction effluent is being dumped from said reactor to said flash tank, wherein the magnitude of said first signal varies as a function of time and wherein the rate at which the magnitude of said first signal varies allows said reaction effluent to be withdrawn at a substantially maximum rate from said reactor without causing flashing across said dump valve;

means for establishing a second signal representative of the opening of said control valve, at any time during which said reaction effluent is being withdrawn from said reactor and provided to said flash tank, required to maintain the actual pressure in said flash tank substantially equal to a maximum allowable pressure;

a low select means;

means for providing said first signal and said second signal to said low select means, wherein said low select means selects the one of said first and second signals which is representative of the lesser opening of said control valve to be established as a third signal; and means for manipulating said control valve in response to said third signal.

2. Apparatus in accordance with claim 1 wherein vapors are withdrawn from said flash tank through a vapor line and wherein said means for establishing said second signal comprises:

means for establishing a fourth signal representative of the actual pressure in said flash tank;

means for establishing a fifth signal representative of the maximum allowable pressure in said flash tank;

means for comparing said fourth signal and said fifth signal and for establishing a sixth signal which is responsive to the difference between said fourth signal and said fifth signal, wherein said sixth signal to scaled so as to be representative of the flow rate of vapor through said vapor line required to maintain the actual pressure in said flash tanks substantially equal to the maximum allowable pressure;

means for establishing a seventh signal representative of the actual flow rate of vapor through said vapor line; and means for comparing said sixth signal and said seventh signal and for establishing said second signal which is responsive to the difference between said sixth signal and said seventh signal.

3. Apparatus in accordance with claim 2 additionally comprising:

means for providing steam to said flash tank;

means for establishing an eighth signal representative of the ratio of the flow rate of vapor through said vapor line to the flow rate of steam to said flash tank required to maintain a desired ratio of the flow rate of the reaction effluent through said dump line to the flow rate of steam to said flash tank;

means for multiplying said seventh signal by said eighth signal to establish a ninth signal which is representative of the desired flow rate of steam to said flash tank;

means for establishing a tenth signal which is representative of the actual flow rate of steam to said flash tank;

means for comprising said ninth signal and said tenth signal and for establishing an eleventh signal which is responsive to the difference between said ninth signal and said tenth signal; and means for manipulating the flow rate of steam to said flash tank in response to said eleventh signal.

4. Apparatus in accordance with claim 3 wherein said reaction effluent comprises poly (arylene sulfide) and a polar organic diluent and wherein said polar organic diluent is removed as a vapor from said flash tank through said vapor line.

5. A method for controlling the rate at which reaction effluent is withdrawn from a reactor and provided through a dump line to a flash tank, wherein a dump valve and a control valve are operably located in said dump line and wherein the reaction effluent flows through said dump valve before flowing through said control valve, said method comprising the steps of:

using computing means to establish a first signal representative of the desired opening of said control valve at any time during which said reaction effluent is being dumped from said reactor to said flash tank, wherein the magnitude of said first signal varies as a function of time and wherein the rate at which the magnitude of said first signal varies allows said reaction effluent to be withdrawn at a substantially maximum rate from said reactor without causing flashing across said dump valve;

using computing means to establish a second signal representative of the opening of said control valve, at any time during which said reaction effluent is being withdrawn from said reactor and provided to said flash tank, required to maintain the actual pressure in said flash tank substantially equal to a maximum allowable pressure;

using low select means to establish a third signal which is representative of the one of said first and second signals which is representative of the lesser opening of said control valve; and manipulating said control valve in response to said third signal.

6. A method in accordance with claim 5 wherein vapors are withdrawn from said flash tank through a vapor line and wherein said step of establishing said second signal comprises:

establishing a fourth signal representative of the actual pressure in said flash tank;

establishing a fifth signal representative of the maximum allowable pressure in said flash tank;

using computing means to compare said fourth signal and said fifth signal and to establish a sixth signal which is responsive to the difference between said fourth signal and said fifth signal, wherein said sixth signal is scaled so as to be representative of the flow rate of vapor through said vapor line required to maintain the actual pressure in said flash tanks substantially equal to the maximum allowable pressure;

establishing a seventh signal representative of the actual flow rate of vapor through said vapor line; and using computing means to compare said sixth signal and said seventh signal and to establish said second signal which is responsive to the difference between said sixth signal and said seventh signal.

7. A method in accordance with claim 6 additionally comprising the steps of:

providing steam to said flash tank;

using computing means to establish an eighth signal representative of the ratio of the flow rate of vapor through said vapor line to the flow rate of steam to said flash tank required to maintain a desired ratio of the flow rate of the reaction effluent through said dump line to the flow rate of steam to said flash tank;

using computing means to multiply said seventh signal by said eighth signal to establish a ninth signal which is representative of the desired flow rate of steam to said flash tank;

establishing a tenth signal which is representative of the actual flow rate of steam to said flash tank;

using computing means to compare said ninth signal and said tenth signal and to establish an eleventh signal which is responsive to the difference between said ninth signal and said tenth signal; and manipulating the flow rate of steam to said flash tank in response to said eleventh signal.

8. A method in accordance with claim 7 wherein said reaction effluent comprises poly (arylene sulfide) and a polar organic diluent and wherein said polar organic diluent is removed as a vapor from said flash tank through said vapor line.

* * * * *